Figure 1:
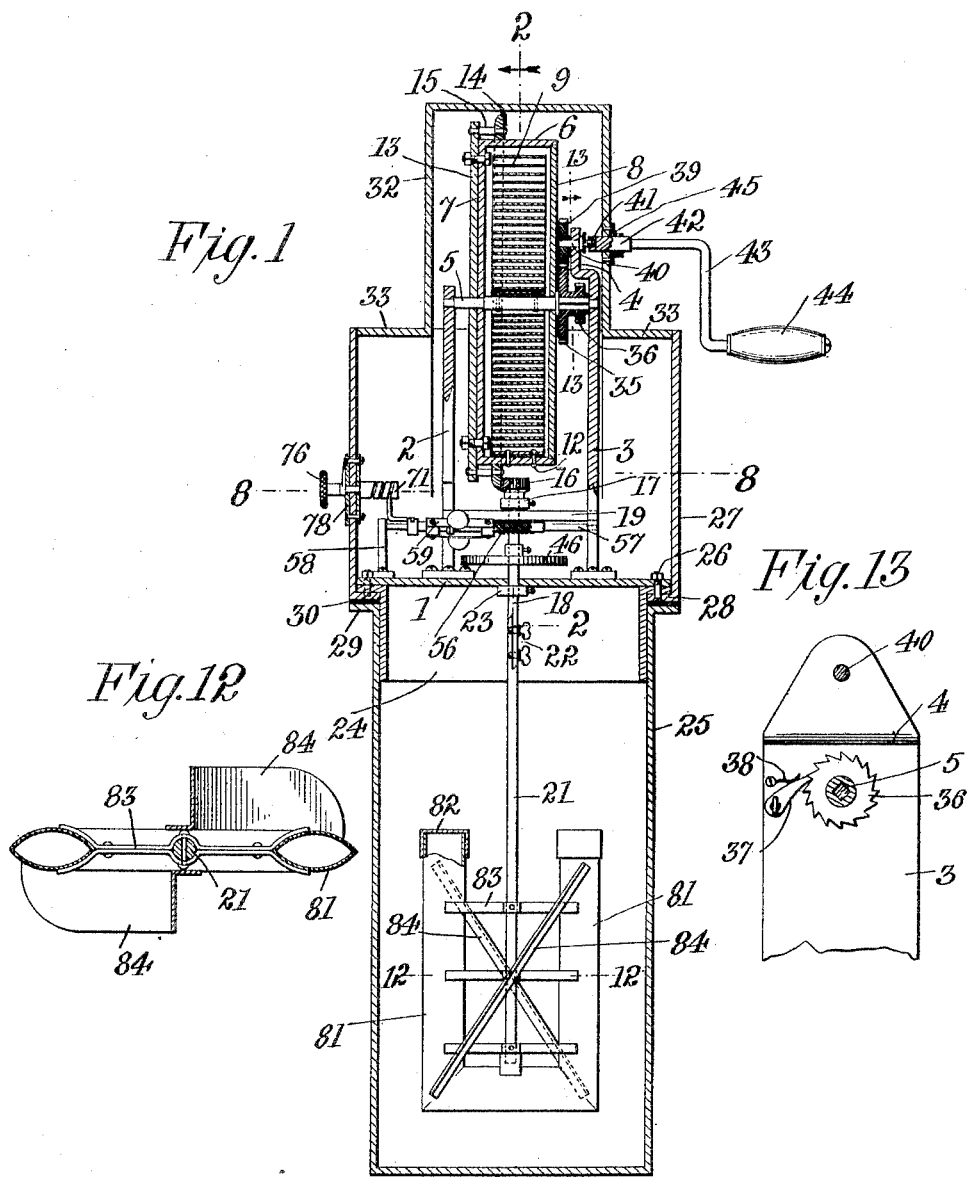

F. B. MARRIOTT.
SPRING MOTOR.
APPLICATION FILED OCT. 18, 1912.
1,108,456.
Patented Aug. 25, 1914.
4 SHEETS—SHEET 2.
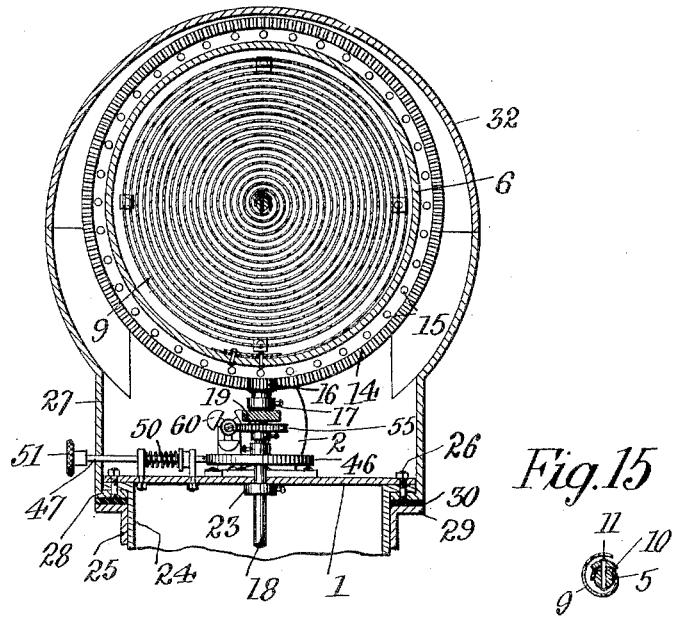
Fig. 2
Fig. 15
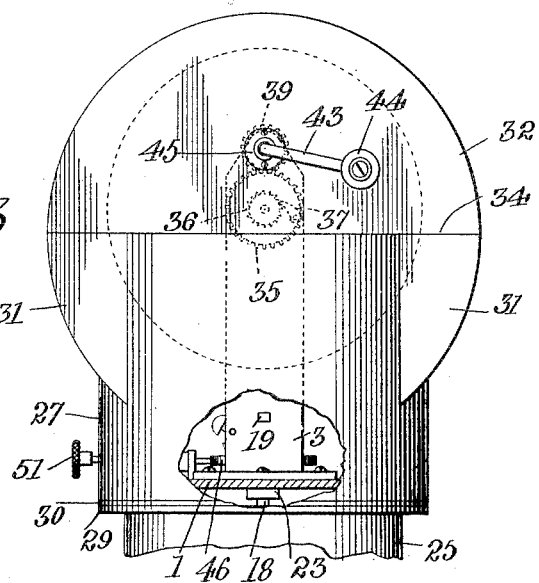
Fig. 3
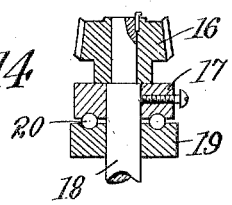
Fig. 14
WITNESSES
F. B. Marriott,
INVENTOR
Attorney

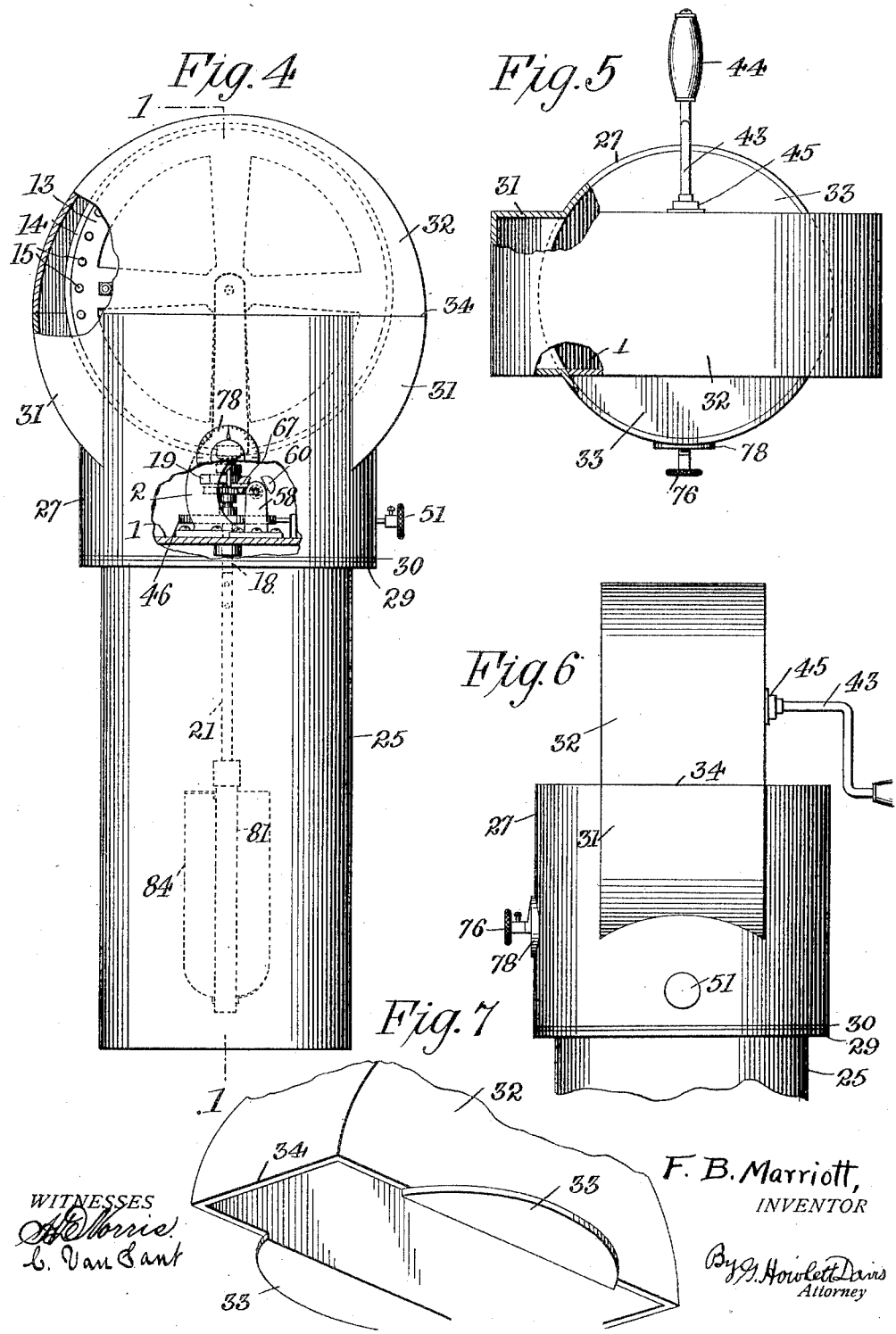

F. B. MARRIOTT.
SPRING MOTOR.
APPLICATION FILED OCT. 18, 1912.
1,108,456. Patented Aug. 25, 1914.
4 SHEETS—SHEET 4.
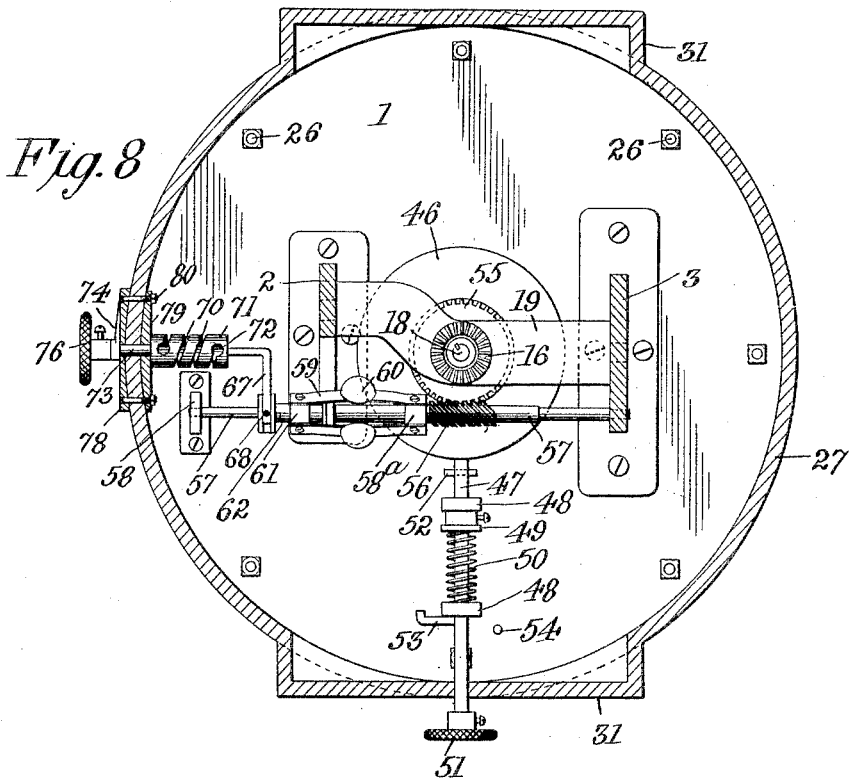
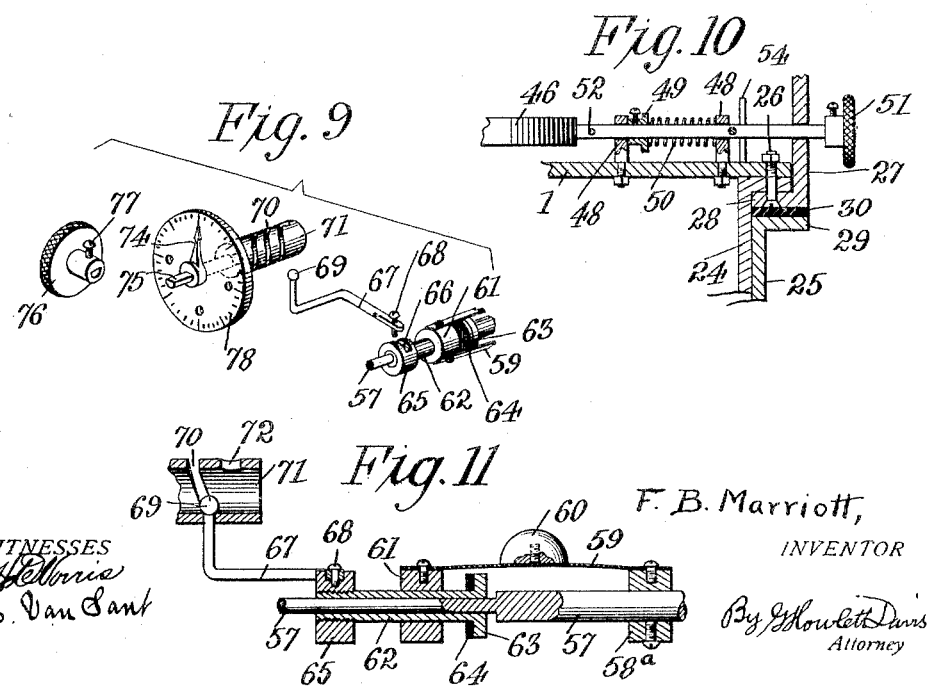
F. B. Marriott,
INVENTOR
WITNESSES
By G. Howlett Davis
Attorney

UNITED STATES PATENT OFFICE.

FRANCISCUS B. MARRIOTT, OF HOMEWOOD, ALABAMA.

SPRING-MOTOR.

1,108,456.  Specification of Letters Patent.  Patented Aug. 25, 1914.

Application filed October 18, 1912. Serial No. 726,505.

*To all whom it may concern:*

Be it known that I, FRANCISCUS B. MARRIOTT, a citizen of the United States, residing at Homewood, in the county of Monroe and State of Alabama, have invented certain new and useful Improvements in Spring-Motors, of which the following is a specification.

My invention relates to spring motors, and particularly to the application of such motors to the operation of churns.

Many attempts have heretofore been made to operate churns, sewing-machines, etc., by means of spring motors, but the various mechanisms devised have, for the most part, proven impractical.

The object of the present invention is to provide a spring operated churn which shall overcome many of the defects of the prior devices, and which shall be especially adapted for domestic use.

To this end the invention contemplates a motor of compact form and simple construction, arranged to be used in connection with any suitable churn or milk vessel. The motor mechanism is entirely inclosed and protected from dust and dirt by means of a casing, and such casing is constructed to rest upon the upper edge of a milk vessel, and be supported thereby. The drive shaft projects downwardly from the casing, and is detachably connected with the dasher rod, the construction being such that the motor casing can be lifted off the churn, leaving the dasher in the latter.

In order that my invention may be readily understood, reference is had to the accompanying drawings, forming part of this specification, and in which:

Figure 1 is a central vertical section through the motor and churn complete, parts being shown in elevation; Fig. 2 is a section at right angles to Fig. 1, taken substantially on the line 2—2 of Fig. 1, looking in the direction of the arrow; Fig. 3 is a side elevation of the motor mechanism casing, parts being broken away; Fig. 4 is a complete side elevation of the casing and churn, parts being broken away, the view being taken from the direction opposite to that of Fig. 3; Fig. 5 is a top plan view of the motor casing, parts being broken away; Fig. 6 is an elevation of the motor casing looking in a direction at right angles to Fig. 4; Fig. 7 is a fragmentary perspective view of the hood removed; Fig. 8 is a horizontal section on an enlarged scale on the line 8—8 of Fig. 1; Fig. 9 is a detailed perspective view of the speed controlling mechanism, the parts being shown separated; Fig. 10 is a side elevation on an enlarged scale of my improved stop mechanism and associate parts, some of the parts being shown in section; Fig. 11 is a fragmentary enlarged sectional view of the governor mechanism; Fig. 12 is a section on an enlarged scale along the line 12—12 of Fig. 1; Fig. 13 is a detailed sectional elevation on an enlarged scale, substantially on the line 13—13 of Fig. 1 looking in the direction of the arrow; Fig. 14 is an enlarged sectional view showing the thrust bearing for the driving shaft; and Fig. 15 is a fragmentary sectional view on an enlarged scale showing the method of securing the spring to the winding shaft.

Referring to the drawings in detail, 1 designates a circular, horizontally disposed base plate to which are secured the vertical spaced standards 2 and 3, the standard 3 having an offset portion 4 near its upper end. Journaled in the standards 2 and 3 is a shaft 5 on which is loosely mounted a spring drum 6, having circular end faces 7 and 8. Secured to the shaft 5 is one end of a coiled spring 9, the other end of which is secured at 12 to the drum, the spring lying within and being inclosed by said drum. The preferred method of attaching the spring to the shaft is by means of reinforcing plate 10 and fastening device 11, as clearly shown in Fig. 15.

Secured to the face 7 of the spring drum is a spider 13, having an edge which projects radially beyond the drum, and to such projecting edge is rigidly secured, as by means of shouldered rivets 15, a beveled main driving wheel 14. It will be noted that this wheel is in the form of an annular rim which snugly fits the drum 6.

Adapted to mesh with the drive wheel 14 is a beveled pinion 16 rigidly secured to a drive shaft 18 which extends vertically through the base plate 1 and is journaled in a cross bar 19 which is supported by the standards 2 and 3. The weight of this shaft is preferably supported by means of a thrust bearing, which may consist, as shown in Fig. 14, of a collar 17 fast on the shaft and the series of balls 20 arranged between said collar and the bar 19, and running in suitable race ways.

21 designates the dasher rod of the churn which is connected with the drive shaft 18 by means of any suitable form of readily detachable coupling, shown in this instance as a splice secured by means of thumb nuts. A collar 23 secured to the shaft 18, just below the base plate 1, prevents longitudinal movement of such shaft relative to such plate. A depending flange 24 is secured to the base plate 1 as by means of bolts 26 and is adapted to fit within the mouth of any suitable milk vessel or churn 25.

27 designates a cylindrical housing which incloses the base 1 and mechanism supported thereby, and is provided with an inturned flange 28 through which the bolts 26 pass in such a manner that the flange 24, the base 1, and the housing 27 are all rigidly united. The casing thus formed is adapted to be supported by the milk vessel, the flange 28 constituting an annular shoulder adapted to rest upon the upper edge 29 of such milk vessel, a suitable packing 30 of soft material being interposed if desired.

At opposite sides of the cylindrical housing 27 are arranged wings 31, and fitting upon such wings is a semi-cylindrical hood 32 adapted to inclose the upper part of the spring drum and drive wheel, as clearly shown in Fig. 7. The hood 32 is provided with wings 33 which, as shown in Fig. 5, form the top or cover of the housing 27, at each side of the hood. It will be noted that the joint between the hood 32 and housing 27 is a straight line 34, the wings 33 preferably lying below said line. Other methods of forming this joint can, however, be employed without departing from my invention.

Rigidly secured to the shaft 5, outside of the spring drum, is a winding gear 35 with which is integrally formed a ratchet wheel 36. A pawl 37 pivoted to the standard 3 and pressed by a spring 38 is adapted to engage the ratchet wheel 36, as clearly shown in Fig. 13. A pinion 39 meshes with the gear 35 and is carried by a stub shaft 40, journaled in the standard 3 and provided with a screw-threaded end 41. This screw-threaded end is adapted to fit into a socket 42 carried by a winding crank 43, provided with a handle 44 and passing through a ferrule 45 secured to the hood 32.

In order to readily start and stop the motor, I provide an improved brake mechanism. This consists of a disk 46 secured to the drive shaft 18, just above the base plate 1 and the spring pressed plunger 47, the end of which is adapted to engage such disk. The plunger 47 is supported in posts 48 between one of which and a collar 49 is arranged a helical spring 50. A knurled nut 51 is secured to the end of the plunger outside of the casing so that it may be conveniently operated. A cross-pin 52 near the inner end limits the outward movement of the plunger, and an arm 53 near the outer end is adapted to engage a stop pin 54, set into the base plate 1, in such a manner as to hold the inner end of the plunger out of engagement with the disk when the motor is running.

Secured to the shaft 18, just above the disk 46, is a wormwheel 55 which meshes with a spiral gear 56 carried by a shaft 57, journaled at its ends in the standard 3 and in a third standard 58. Secured to the shaft 57 is a collar 58ª to which is secured one end of a number of leaf springs 59, to the center of each of which is secured a weight 60. The other end of said springs is secured to a collar 61 which slides loosely on a sleeve 62, which is itself loosely journaled on a reduced portion of the shaft 57. At its inner end, the sleeve 62 is provided with a head 63, to the inner face of which is secured a washer 64 of suitable soft material, adapted to provide a friction surface. To the other end of the sleeve 62 is secured a nut 65 in which is formed a notch 66. In this notch is secured one end of a lever 67, as by means of a screw 68. The free end of the lever 67 is turned upwardly and preferably terminates in a knob 69.

A spiral slot 70 is formed in a short tubular member 71, secured to a shaft 73, supported by the casing 27. The slot 70 terminates in an enlarged opening 72, through which the knob 69 is adapted to pass in such a manner that the upturned end of the lever 67, adjacent the knob, works in the spiral slot 70. Secured to the shaft 73, outside of the casing, is a pointer 74, which pointer is adapted to play over a dial 78. The outer end 75 of the shaft 73 is preferably flattened, as shown in Fig. 9, and a knurled thumb nut 76 is attached to such flattened end as by means of a set screw 77. A reinforcing plate 79 is preferably arranged inside of the casing, and bolts 80 pass through such plate and the dial 78.

The dasher which is secured to the rod 21, as shown in Fig. 1, preferably consists of a U-shaped flattened tube 81, the open ends of which are closed by removable caps 82. Such U-shaped tube is secured to the rod 21 by means of braces 83. Attached to each side of the dasher are inclined blades 84, set in opposite directions so as to produce proper movement of the milk being churned. When it is desired to operate the churn, the spring is wound by means of the handle 44, unwinding being prevented by means of the pawl and ratchet shown in Fig. 13. The spring so wound drives the drum 6 and wheel 14 carried thereby, which in turn causes the shaft 18 and dasher rod 21 to revolve. It will be noted that the dasher is merely suspended from the shaft 18 and thus the use of an unsanitary journal in the milk receptacle is avoided.

The starting and stopping of the motor can be controlled by means of the plunger 47, operated by the nut 51, as will be obvious from an inspection of Figs. 8 and 10. When the arm 53 is engaged with the stop pin 54, the plunger 47 is held away from the disk 46, and the churn permitted to run.

The speed at which the dasher is driven is controlled by means of the governor shown in Figs. 9 and 11. On the dial 78 are indicated various speeds, to any one of which the pointer may be set. The turning of the shaft 73 to move the pointer results in causing the lever 67 to travel in the slot 70, and to thus move the sleeve 62 longitudinally of the shaft 57. Such movement changes the relative normal position of the friction face 64 and the sliding collar 61. It is evident that when the friction face 64 is moved close to such collar, a low speed of the governor-shaft will produce sufficient centrifugal force to cause the weights 60 to move the collar 61 against the friction face, and thus act as a brake to prevent the speed from rising to a greater value. If, on the other hand, the friction face 64 is moved further away from the collar 61, engagement between said collar and friction face will only take place after a greater speed has been attained.

It is thought that the operation and many advantages of my improved mechanism will be readily appreciated by those familiar with such matters, without further discussion.

What I claim is:

1. In a spring motor mechanism, the combination with a circular base plate having a depending annular flange, of motor mechanism supported by said plate, and a drive shaft connected with said mechanism extending through said plate and projecting vertically downward, such shaft being provided with a coupling located between the base plate and the lower edge of said flange, whereby, when the lower portion of said shaft is removed, said flange may be capable of resting upon a flat support.

2. In a spring motor mechanism, the combination with a horizontal base plate, of a pair of standards carried thereby, a spring coiled around said shaft, a shaft journaled in said standards, a beveled drive wheel carried by said shaft, a cross-bar extending between said standards below said drive wheel, a vertically disposed drive shaft journaled in said cross-bar, and passing downwardly through said base plate, a beveled pinion secured to said shaft, and in mesh with said drive wheel, and a thrust bearing between said shaft and cross-bar, whereby the weight of the former is supported.

In testimony whereof I have affixed my signature in presence of two witnesses.

FRANCISCUS B. MARRIOTT.

Witnesses:
J. F. BRYARS,
D. D. COLE.

---

Copies of this patent may be obtained for five cents each, by addressing the "Commissioner of Patents, Washington, D. C."